US005604715A

United States Patent [19]

Aman et al.

[11] Patent Number: 5,604,715

[45] Date of Patent: Feb. 18, 1997

[54] AUTOMATED LUMBER UNIT TRUCKING SYSTEM

[76] Inventors: James A. Aman, 134 Bridle View Way, Souderton, Pa. 18964; William R. Haller, 425 Brighton St., #403, Bethlehem, Pa. 18015

[21] Appl. No.: 530,465

[22] Filed: Sep. 19, 1995

Related U.S. Application Data

[63] Continuation-in-part of Ser. No. 263,090, Jun. 21, 1994, abandoned.

[51] Int. Cl.[6] .......... G01S 3/80

[52] U.S. Cl. .......... 367/118; 367/128

[58] Field of Search .......... 367/6, 128, 907, 367/118; 209/517; 414/279; 901/46; 364/516; 342/357, 457

[56] References Cited

U.S. PATENT DOCUMENTS

| | | | |
|---|---|---|---|
| 3,981,010 | 9/1976 | Michelsen | 342/55 |
| 4,151,525 | 4/1979 | Strauch et al. | 342/83 |
| 4,166,543 | 9/1979 | Dahlstrom | 901/46 |
| 4,247,922 | 1/1981 | Jackson et al. | 367/128 |
| 5,101,444 | 3/1992 | Wilson et al. | 382/48 |
| 5,214,615 | 5/1993 | Bauer | 367/128 |
| 5,241,317 | 8/1993 | Howard | 342/149 |
| 5,283,934 | 2/1994 | Zimpel et al. | 29/33 P |
| 5,432,841 | 7/1995 | Rimer | 342/457 |
| 5,450,329 | 9/1995 | Tanner | 342/357 |

*Primary Examiner*—Daniel T. Pihulic

[57] ABSTRACT

On Fork Lift 100, Load Cell Assemblies **40*a* and 40*b* are affixed to Fork Arms 32*a* and 32*b* and as such are capable of determining the weight of any object lifted by Fork Arm Lift Assembly 30. Continuous weight information is transmitted from Assemblies 40*a* and 40*b* to Fork Lift Computer 52 via wires and IR Transmitter 44 and Receiver 48. Changes in weight information are interpreted as load engagement and disengagement by Computer 52, which then responds by receiving the current relative vertical height of Fork Arm Lift Assembly 30 from Ultrasonic Distance Measuring Unit 56. The Computer 52 then transmits, via Telescoping Antenna 70, an uniquely encoded signal with both weight and height information to Stationary Elevated Locating Modules such as 74*a* and 74*b*, which have been strategically placed throughout the operating range of Fork Lift 100. This signal is then transmitted to Unit Tracking Computer System 80 by Locating Modules such as 74*a* and 74*b*. Using conventional tracking technology, the Computer System 80 determines the current x-y coordinates of transmitting Fork Lift 100 and communicates this information along with the transmitted z coordinate and weight to the Office Computer System 84. Computer System 84 is capable of storing this information is a database of like information for the purposes of tracking the exact three dimensional location and weight of the objects which are being moved by vehicles such as Fork Lift 100**.

36 Claims, 3 Drawing Sheets

AUTOMATED LUMBER UNIT TRUCKING SYSTEM

This application is a continuation in part of Ser. No. 08/263,090, filed on Jun. 21, 1994, now abandoned.

FIELD OF INVENTION

The present invention relates to electronic systems for tracking the movement and location of large objects, such as units of lumber, which must be transported by vehicles, such as fork lifts.

DESCRIPTION OF PRIOR ART

Lumber is most often transferred from primary manufacturer, to wholesaler and finally to retailer in bundled units. These units typically consist of lumber which is always of the same thickness but may vary in width and length. Units are constructed by stacking several layers of uniform width, called courses, on top of each other. Each course consists of several boards laid side by side. Typically, these units are constructed to be approximately four feet wide by four feet high by four to twenty feet long. These dimensions ensure that the unit may be easily transported by the average fork lift. The lumber mill and especially the wholesaler may accumulate many of these lumber malts in their possession at any given time. This requires that they maintain open yards where these units are segregated into like groups for easier tracking.

One of the characteristics of lumber is that it does change in both appearance and structure as it dries and is exposed to the weather. These changes may include discoloration, splitting, checking, warping, etc. Primarily for this reason, lumber wholesalers are desirous of continually "turning" their units, effectively selling off the oldest units before they begin to loose value. One of the solutions to this problem is to build sheds and other structures to store the lumber out of the weather. However, this can be cost prohibitive and typically takes a large investment which may not pay back for up to seven years or more.

In addition to the concerns of "turning" units before they loose value, the wholesaler is also confronted with the logistical problems of tracking the whereabouts of hundreds of units at a single time and thousands of units being received, re-manufactured, repacked and shipped over the course of a years time. These logistical problems are greatly magnified during what is often a short four to five month peak selling season when the wholesaler handles the majority of his inventory. During these peak selling months, inventory levels necessarily increase as does inventory movement. These two factors place a large stress on manual tracking systems which rely on maintaining strict yard organization by at least lumber species, grade, thickness and unit age. The wholesaler may purchase cantilever rack systems so that each unit may be placed in a trackable "bin" thus allowing units to be organized for convenience rather than for easier searching and finding. However, these rack systems are very expensive and require the purchase of special side loading fork lifts which can cost two to four times that of a normal fork lift. Also, such a system necessitates than "bin" numbers are tracked and matched to "unit numbers" which is difficult to do manually and is costly to automate.

Lastly, not only must the wholesaler be concerned with "turning" out the oldest units and being able to quickly and efficiently find any given unit at any given time, but ideally the wholesaler must be able to accurately represent to their customers what lumber they do have available to sell and ready to ship. At most lumber yards, the sales staff which refers to the office inventory tracking system, is reluctant to select one unit to sell versus another because they do not know which unit can be more efficiently found and retrieved. Hence, even when the wholesaler has invested in expensive inventory management software which allows him to know exactly which units are currently in the yard and how old they are, without a yard tracking system he is unable to know the cost in time of "pulling" one unit, which may be older, rather than a second unit, which may be more accessible. This basic inability leads to higher inventory levels which act as "safety stock" to ensure that their are always a certain number of readily accessible units for sale. Of course, higher inventory levels adversely effects profits and exacerbates the aforementioned problems. Conversely, this problem tends to shrink a wholesalers inventory from the salesman's and customers point of view and/or increases the overhead costs of "picking and pulling" which deflates profit margins.

Current solutions to this problem have tended to focus on traditional warehousing and "bin" tracking approaches which are cost prohibitive and difficult to implement for large, variably sized objects, such as units of lumber. Partial solutions exist which require that each unit be tagged with a unique bar coded label so that then can easily be identified by electronic scanning, which can be performed on units which are several feet off the ground and otherwise not easily accessible. However, units are often stacked several high and several deep, especially in sheds where space is a premium. Under these conditions, labeled tags cannot always be read. Also, tags may easily fall off and do not weather well and hence over time become unreadable. Most wholesalers simply resort to painting and marking units with identifying codes and to trying to keep as organized a yard as possible.

More exotic solutions exist which would allow each unit to be fitted with what is known as Surface Acoustical Waveform ("SAW") Tags. These tags are small pieces of ceramic which resonate at a identifiably unique frequency when they are impacted by certain energies, such as could be emitted by a hand held electronic device. However, these tags currently cost more than a dollar a piece and must be attached to each unit, which has a labor cost. These tags may also fall or be knocked off the unit. Systems based upon such solutions require a separate location gathering methodology to effectively remember at all times where each unit has been placed. This could be accomplished with a hand held device that simply recorded the units last position matched to its "SAW's" tags unique code. Such a method would require human interaction and could be prone to error if the wrong unit's tag is "heard" and associated with the unit currently be placed.

Given the current state of the art in omni-directional object tracking, it is possible to create an entirely automated lumber unit tracking system which maintains the constant whereabouts of every unit in both a yard and it's sheds at all times, without the need of affixing any form of device or object to the unit-thus providing real time unit location information greatly increasing a wholesalers ability to "turn" and otherwise manage his inventory.

OBJECTS AND ADVANTAGES

Accordingly, the objects and advantages of the present invention are:

1. to provide a system for tracking the three dimensional coordinates of all units of lumber located in a lumber yard or it's sheds without the aid of a human;
2. to provide such a system without the requirement of any form of "tag" to be attached or otherwise associated with each individual unit;
3. to provide a system of the highest accuracy which will not be prone to confuse units;
4. to provide a system which will not require any additional structures to be built for "bin" storage or any other purposes; and
5. to provide a system which maintains the location of each and every unit on a constant, real time basis, even as multiple units are being received, moved and shipped by multiple fork lifts at any given instant.

Further objects and advantages are to provide a system with a minimum of moving parts capable of withstanding a large variation of environmental conditions. Still further objects and advantages of the present invention will become apparent from a consideration of the drawings and ensuing description.

SPECIFICATION

Figure 1:
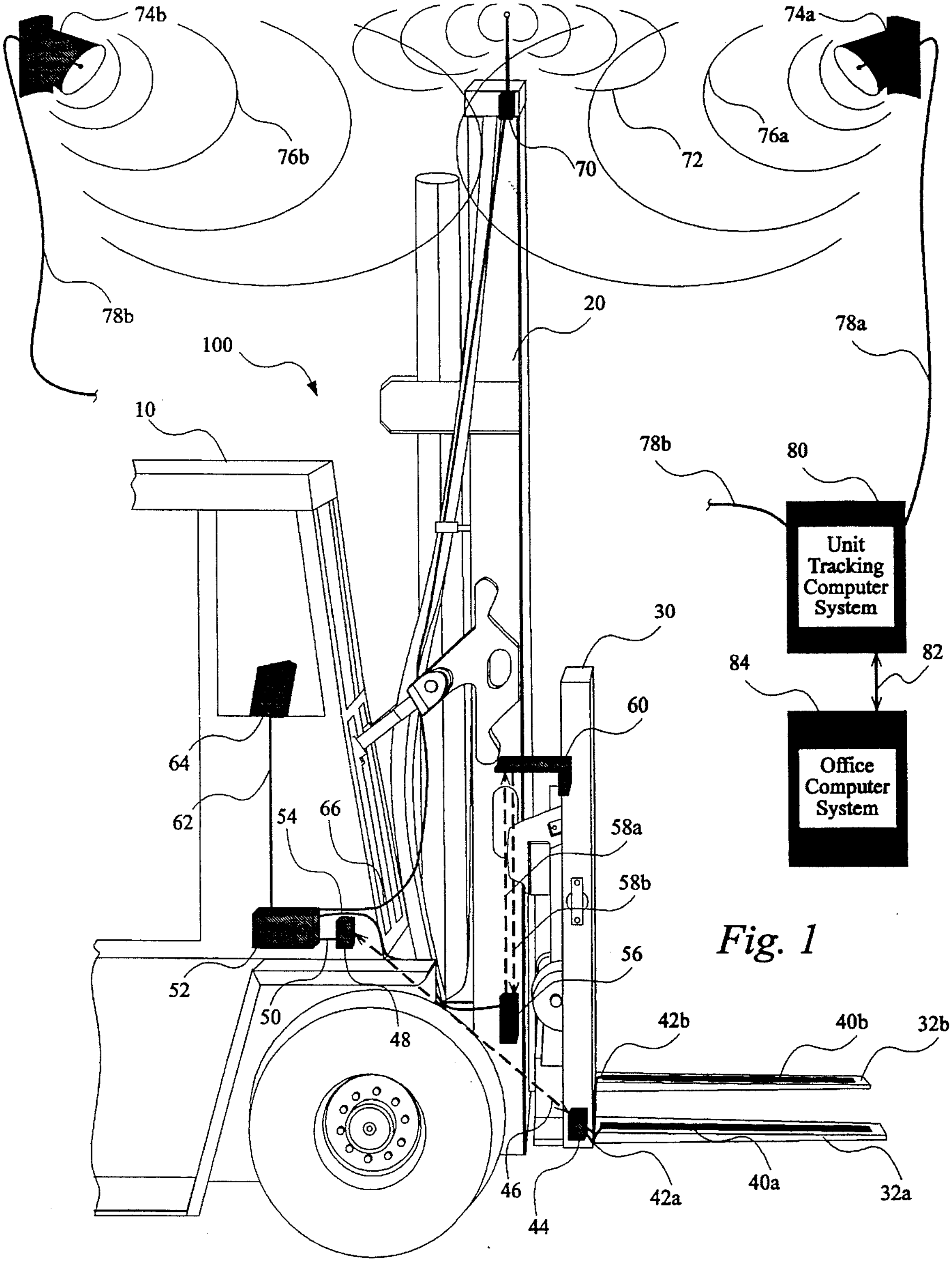
FIG. 1 is a perspective drawing of the proposed Automated Lumber Unit Tracking System based upon electronically tracking the movements of a fork lift and the height of its fork arm lift assembly.

Referring to FIG. 1 there is shown a perspective drawing of the preferred embodiment of the Automated Lumber Unit Tracking System comprising Fork Lift 100, Stationary Elevated Locating Modules 74*a* and 74*b*, Unit Tracking Computer System 80, and Office Computer System 84. (Throughout this discussion and within the provided figures, the necessary power sources for the described devices are neither discussed nor depicted and should be assumed to conventional for such technology.) Fork lift 100 further comprises Motorized Carriage 10, Fork Arm Lift Track 20 and vertically movable Fork Arm Lift Assembly 30. Fork Arm Lift Assembly 30 further comprises Fork Arms 32*a* and 32*b* upon which lumber units to be moved will be set. Affixed to Fork Arms 32*a* and 32*b* are respective Load Cell Assemblies 40*a* and 40*b*.

Load Cell Assemblies 40*a* and 40*b* measure the weight of any lumber unit placed upon the respective fork arms 32*a* and 32*b*. Alternatively, Fork Lift 100 may be fitted with a weight measuring system which utilizes the hydraulic pressure which is used to vertically displace Fork Lift Arm Assembly 30 with respect to Fork Arm Lift Track 20 for measuring the weight of the lumber unit.

Load Cell Assemblies 40*a* and 40*b* are attached by wires 42*a* and 42*b* respectively to IR transmitter 44, which is attached to the side of the Fork Arm Lift Assembly 30. IR Transmitter 44 is in constant communication with cooperating IR Receiver 48, which is attached to the side of the Motorized Carriage 10. IR Receiver 48 is attached by Wire 50 to Fork Lift Computer 5:, which is affixed to the side of Motorized Carriage 10.

Fork Lift Computer 52 is attached by Wire 54 to Ultrasonic Distance Measuring Unit 56, which is attached to the Fork Arm Lift Track 20. Ultrasonic Distance Measuring Unit 56 transmits vertically directed Pulsed Incident Ultrasonic Energy 58a which is reflected off of Ultrasonic Reflector 60, which is attached to the Fork Arm Lift Assembly 30. Unit 56 further receives Reflected Ultrasonic Energy 58*b* from Ultrasonic Reflector 60.

Fork Lift Computer 52 is connected by Wire 62 to Conventional I/O Device 64, which is attached to the Motorized Carriage 10. Computer 52 is further connected by Wire 66 to Telescoping Antenna 70, which is attached to the Fork Arm Lift Track 20. Telescoping Antenna 70 is in bi-directional communication with Stationary Elevated Locating Modules 74*a* and 74*b*, via signals 72, 76*a* and 76*b*. Modules 74*a* and 74*b* are in communication with Unit Tracking Computer System 80 via Wires 78*a* and 78*b* respectively. The Unit Tracking Computer System 80 is in further communication with the Office Computer System 84 via Wire 82.

Operation

In normal operation, Fork Lift 100 may traverse an area of five or more acres which is typically referred to as the lumber yard. Lumber units are strategically placed throughout the entire yard according to lumber yard management requirements. These units are continually brought into the yard as a part of normal inventory receiving, continually moved about the yard as a part of normal remanufacturing, and continually removed from the yard as a part of normal shipping. Within this same yard, there may be both open and closed sheds which are used to store selected lumber units out of the weather. These sheds are typically made of concrete and metal. A plurality of Stationary Elevated Locating Modules such as 74*a* and 74*b* will be strategically placed throughout any of the open or enclosed areas of the lumber yard. This plurality of modules maintains constant communications with all fork lifts operating within the yard.

Figure 2:
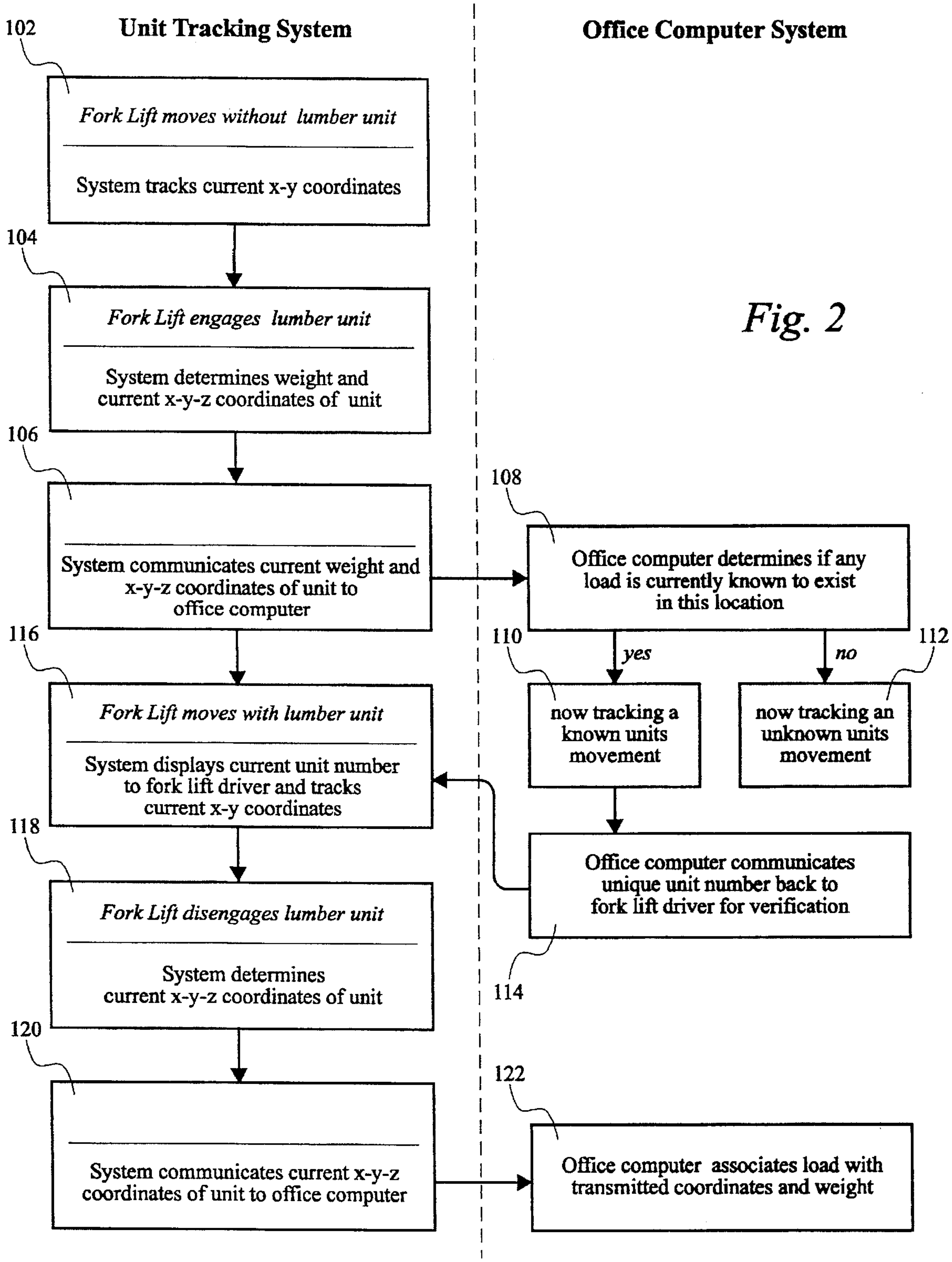
FIG. 2 is a flow diagram of the operation of the proposed invention.

The following discussion of the operation of the Automated Lumber Unit Tracking System will follow the steps outlined in FIG. 2 while referring back to FIG. 1 for a detailed explanation. Referring to Step 102, operation commences when a Fork Lift 100 moves without a lumber unit set upon its Load Cell Assemblies 40*a* and 40*b*. As the Fork Lift 100 moves, Fork Lift Computer 52 places onto Wire 66 an encoded signal which flows to Telescoping Antenna 70. Telescoping Antenna 70 radiates an Omni-directional Signal 72 which is then received by numerous Stationary Elevated Locating Modules similar to 74*a* and 74*b*. This encoded signal uniquely identifies Fork Lift 100. Using conventional tracking technology, the Unit Tracking Computer System 80, which is in communication with Modules 74*a* and 74*b*, continuously determines the current x-y coordinates of the moving Fork Lift 100, as indicated in Step 102.

Referring to Step 104, the next significant event occurs when Fork Lift 100 engages a load. This engagement takes place when the Fork Lift 100 operates normally to lift a lumber unit with its Fork Arm Lift Assembly 30. As the Fork Arm Lift Assembly 30 engages the lumber unit, Load Cell Assemblies 40*a* and 40*b* determine the unit's weight and communicates this information to IR Transmitter 44 via Wires 42*a* and 42*b*, respectively. IR Transmitter 44 further communicates the weight information via IR Link 46 to IR Receiver 48. IR Receiver 48 further communicates this information to Fork Lift Computer 52 via Wire 50. In response to receiving the weight information, Computer 52 inputs the current relative vertical height information of Fork Lift Arm Assembly 30 from Ultrasonic Distance Measuring Device 56. Device 56 determines this vertical height information by utilizing conventional pulsed incident and reflected ultrasonic energy distance measuring technology. Thus the lumber units weight and current x-y-z coordinates at the time of engagement have been determined by the unit tracking system, as indicated in Step 104.

Referring to Step 106, Fork Lift Computer 52 transmits previously determined weight and height information by placing an encoded signal onto Wire 66 which flows to Telescoping Antenna 70. Antenna 70 radiates an Omnidirectional Signal 72 including this information which is then received by numerous Stationary Elevated Locating Modules similar to 74*a* and 74*b*. Unit tracking Computer System 80 combines this weight and initial relative vertical height information with the currently determined x-y coordinates of the communicating Fork Lift 100. This combined information is transmitted by the Unit Tracking Computer System 80 to the Office Computer System 84 via bi-directional communications link 82, as indicated in Step 106.

Referring to Step 108, the Office Computer System 84 compares this information to its existing database of like information and determines whether the Fork Lift 100 has now engaged a previously identified, i.e. known, or unidentified, i.e. unknown lumber unit. This determination is depicted as Steps 110 and 112. If the Office Computer System 84 has determined that this is an known unit, it then communicates the associated unique unit number onto bi-directional communications Wire 82 to Unit Tracking Computer System 80, as indicated in Step 114. The Computer System 80 further communicates the associated unique unit number to Fork Lift 100 via Wires 78*a* and 78*b* to respective Stationary Elevated Locating Modules 74*a* and 74*b*. Modules 74*a* and 74*b* further communicate this information via respective Radiated Signals 76*a* and 76*b* to Telescoping Antenna 70. Antenna 70 receives these signals and further communicates this information via Wire 66 to Fork Lift Computer 52.

Referring to Step 116, Fork Lift Computer 52 further communicates the unique unit number via Wire 62 to I/O Device 64 for verification by the fork lift driver. As the Fork Lift 100 continues to traverse throughout the lumber yard with the engaged lumber unit, Stationary Elevated Locating modules 74*a* and 74*b* continuously Receive Omni-directional Signal 72 from Telescoping Antenna 70, whereby the Unit Tracking Computer System 80 continuously determines the x-y coordinates of the Fork Lift 100, as indicated in Step 116.

When the Fork Lift 100 has arrived at the final desired destination at which the lumber unit will be placed, the Fork Arm Lift Assembly 30 disengages the unit as referred to in Step 118. This disengagement takes place when the Fork Lift 100 operates normally to set the lumber unit in the desired location. As the Fork Arm Lift Assembly 30 disengages the lumber unit, Load Cell Assemblies 40*a* and 40*b* now begin to transmit zero weight detected information to Fork Lift Computer 52 to via Wires 42*a* and 42*b*, IR Transmitter 44 and Receiver 48, and Wire 50. In response to receiving the zero weight detected information, Computer 52 inputs the current relative vertical height information of Fork Arm Lift Assembly 30 from Ultrasonic Distance Measuring Device 56. Fork Lift Computer 52 transmits previously determined zero weight and vertical height information to Unit Tracking Computer System 80 via Wire 66, Antenna 70, Signal 72, Locating Modules 74*a* and 74*b*, and Wires 78*a* and 78*b*. Unit Tracking Computer System 80 combines this weight and final relative vertical height information with the currently determined x-y coordinates of the communicating Fork Lift 100, as indicated in Step 118. This combined information is transmitted by Unit Tracking Computer System 80 to Office Computer System 84 via bi-directional communications Wire 82, as indicated in Step 120.

As referred to in Step 122, the Office Computer System 84 adds this information to its existing database of like information. If the now transported lumber unit was determined to be previously known, the System 84 updates its current coordinates. If the unit was previously unknown, the System 84 associates this information with a new unique unit number as well as the now determined weight and final x-y-z coordinates.

Alternate embodiment

Specification

Figure 3:
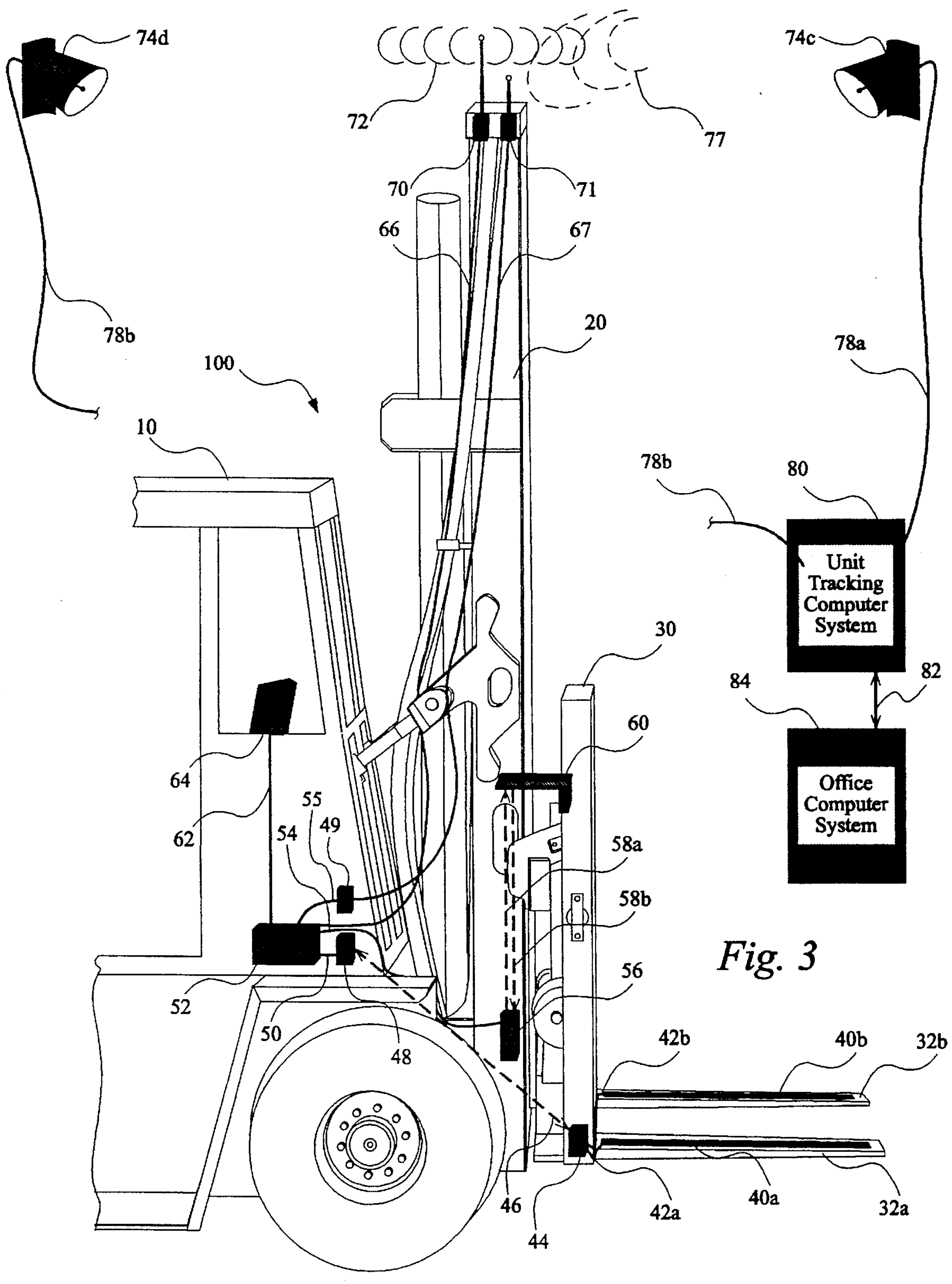
FIG. 3 is a perspective drawing of an alternate embodiment of the Automated Lumber Unit Tracking System which employs GPS technology to assist in the tracking of the fork lift movements while in all other ways being similar to the preferred embodiment.

Referring now to FIG. 3 there is shown alternate embodiment 101 of the above invention. It is understood that only significant differences are illustrated with those parts common to both the preferred embodiment and alternate embodiment having the same numeric designation as in the preferred embodiment. In alternate embodiment 101, fork lift 10 additionally comprises global positioning satellite (GPS) antenna 71 which is attached to fork lift 10 near antenna 70. GPS antenna 71 is capable of receiving GPS signals 77 as transmitted by overhead satellites (not shown). Antenna 71 is further capable of transmitting received GPS signals 77 to GPS receiver 49 via wire 67. GPS receiver 49 is capable of translating GPS signals 77 into the continuous current x-y coordinates of fork lift 10. Receiver 49 further communicates with computer 52 via wire 55. Computer 52 is capable of transmitting signals along wire 66 to antenna 70 which are then transmitted as omni-directional signals 72 and may be received by either of receiving modules 74*c* and 74*d* which have replaced locating modules 74*a* and 74*b* of the preferred embodiment, respectively. Receiving modules 74*c* and 74*d* further communicate to unit tracking computer system 80 along wire 78*a*.

Operation

In operation, antenna 71 continuously receives GPS signals 77 which it then transmits to GPS receiver 49 along wire 67. GPS receiver 49 then continuously translates the longitude and latitude information contained in signals 77 to determine the current x-y coordinates of fork lift 10. Receiver 49 further continuously transmits current x-y coordinates to fork lift computer 52 along wire 55. Computer 52 then combines the current x-y coordinate information with the current fork height and load weight information which it then continuously transmits along wire 66 to antenna 70 to be continuously broadcast as omni-directional signal 72. Signal 72 is then received by either or both of receivers 74*c* and 74*d* which then transmit the contained information to unit tracking computer system 80 along wire 78*a*. Computer system 80 does not need to perform any special calculations on transmitted signal 72 to determine the current x-y coordinates of fork lift 10 since signal 72 already comprises this information as translated by GPS receiver 49 from GPS signals 77.

Conclusion, Ramifications, and Scope of Invention

Thus the reader will see that the Automated Lumber Unit Tracking System provides a system capable of tracking the three dimensional coordinates of all units of lumber located in a lumber yard or its sheds without the aid of a human or any form of a "tag" attached to each unit. Furthermore, the reader will note that the system is not prone to confuse individual units or their locations and does not require the construction of any special "bin" storage structures. Subsequently, the System is able to maintain the location of each and every unit on a constant, real time basis, even as multiple units are being received, moved and shipped by multiple fork lifts at any given instant.

While the above description contains many specifications, these should not be construed as limitations on the scope of the invention, but rather as an exemplification of preferred embodiments thereof. Many other variations are possible. It is evident from the description of the Automated Lumber Unit Tracking System that is has applicability beyond that of tracking the location of units of lumber. For example, lumber yards also handle large timbers and engineered wood product beams which must also be moved via fork lift and can be tracked in a similar means as described herein. There are other industries, such as metal, which handle large products which must be transported via fork lifts about geographic areas. Metal I-beams, bundles of extruded bars, bundles of sheets, coils of steel, plates, etc. are all examples of such products. It is therefore considered that the Automated Lumber Unit Tracking System is in general capable of automatically tracking the three dimensional coordinates and weight of all products which are large enough to be required to be moved via fork lift.

It should also be apparent to those skilled in the art, that for smaller objects, such as individual pieces of tool steel, that are primarily moved by human hands, this exact system may be replicated by outfitting the human hands with special pressure sensitive gloves to note engagement and disengagement and which can emit omni-directional signals capable of being tracked by stationary elevated locating modules.

Furthermore, the established link between the office computer system which contains valuable data on all current products within the given geographic area and the fork lift input/output device, make it possible for the office computer to not only record but also direct the movement of products such as lumber units. It is also evident that the office computer may be directed by the fork lift operator as to the unique object identifier code that should be associated with the currently engaged and heretofore unknown object if this is preferable to having the code automatically assigned by the office computer. Such may be the case if the previously unknown load has already be assigned a code, as would be found on a bar coded tag for example, as a part of it's recent handling. Accordingly, the scope of the invention should be determined not by the embodiments illustrated, but rather by the appended claims and their legal equivalents.

From the foregoing detailed description of the present invention, the Automated Lumber Unit Tracking System, it will be apparent that the invention has a number of advantages, some of which have been described above and others of which are inherent in the invention. Also, it will be apparent that modifications can be made to the Automated Lumber Unit Tracking System without departing from the teachings of the invention. Accordingly, the scope of the invention is only to be limited as necessitated by the accompanying claims.

We claim:

1. An automated omni-directional object tacking system operable within a prescribed arm comprising: means for engaging/disengaging said object;

means for transporting said engaged object from an initial engaged position to a final disengaged position; and means responsive to said transporting means for determining said initial and final positions of said object.

2. The invention of claim 1 wherein said engaging/disengaging means further comprises:

means for determining the times of said engagement and disengagement of said object; and means responsive to said times determining means for determining the z coordinate of said object.

3. The invention of claim 2 wherein said transporting means further comprises:

means for continuously transmitting an omni-directional signal;

means for receiving from said engaging/disengaging means said z coordinate of said object; and means for including said z coordinate with said omni-directional signal at said times of engagement and disengagement.

4. The invention of claim 3 wherein said transporting means further comprises means for including said determined times of engagement and disengagement with said omni-directional signal at said times of engagement and disengagement.

5. The invention of claim 4 wherein said means for determining said initial and final positions of said object further comprises:

means for continuously receiving said omni-directional signal from said transporting means;

means for continuously determining from said omni-directional signal the current x-y coordinates of said object;

means for detecting said determined times of engagement and disengagement and said z coordinate information which was included with said omni-directional signal; and means for determining said initial and final positions of said object based upon said current x-y and z coordinates and said detected times engagement and disengagement.

6. The invention of claim 4 wherein said transporting means further comprises:

means for receiving remotely transmitted x-y coordinate information pertaining to said object; and means for including said x-y coordinates of said object with said omni-directional signal at said times of engagement and disengagement.

7. The invention of claim 6 wherein said means for determining said initial and final positions of said object further comprises:

means for continuously receiving said omni-directional signal from said transporting means;

means for detecting said determined times of engagement and disengagement and said x-y and z coordinate information which was included with said omni-directional signal; and means for determining said initial and final positions of said object based upon said current x-y and z coordinate information and said detected times of engagement and disengagement.

8. An automated object identification system operable within a prescribed area containing a group of one or more objects comprising;

means for determining the initial position of any of said objects within said group of objects; and means responsive to said initial position determining means for identifying said any object based upon said initial position.

9. The invention of claim 8 wherein said initial position determining means comprises:

means for engaging said any object;

means responsive to said engaging means for determining the initial x-y coordinates of said any object; and means responsive to said engaging means for determining the initial z coordinate relative to said x-y coordinates of said any object.

10. The invention of claim 8 wherein said identifying means comprises:

means for comparing said initial position of said any object to a set of all last known positions of said objects within said group of objects; and means for determining said identity of said any object from said comparison.

11. The invention of claim 9 wherein said means for determining the initial x-y coordinates of said any objects further comprises:

means for continuously transmitting an omni-directional signal; and means for continuously determining from said omni-directional signal the current x-y coordinates of said object.

12. The invention of claim 9 wherein said means for determining the initial x-y coordinates of said any objects further comprises means for receiving remotely transmitted x-y coordinates.

13. An automated omni-directional object tracking system for tracking said object during the time said object is being transported by a transporting vehicle comprising:

means for determining the time of engagement/disengagement of said object by said transporting vehicle; and means responsive to said time of engagement/disengagement determining means for determining the coordinates of said object during the time said object is being transported by said transporting vehicle.

14. The invention of claim 13 wherein said means for determining said coordinates of said object comprises:

means for continuously transmitting an omni-directional signal; and means for continuously determining from said omni-directional signal the current x-y coordinates of said object.

15. The invention of claim 13 wherein said means for determining said coordinates of said object further comprises means for receiving remotely transmitted x-y coordinates.

16. An automated omni-directional object tracking system operable within a prescribed area, said object being first engaged and then disengaged by a transporting means, comprising:

means for receiving remotely transmitted x-y coordinate information;

means for determining the z coordinate of said engaged or disengaged object with respect to said transporting means; and means responsive to said received x-y coordinate information and said z coordinate information for determining the absolute x-y-z coordinates of said object.

17. The invention of claim 16 wherein said means for receiving remotely transmitted x-y coordinate information further comprises means for receiving information from the Global Satellite Positioning System.

18. The invention of claim 16 wherein said object tracking system further comprises:

means responsive to absolute x-y-z coordinate determining means for transmitting said coordinate information to a remote computer system;

means for receiving into remote computer system multiple transmitted signals containing said coordinate information pertaining to multiple objects being simultaneously transported by multiple transporting vehicles; and means for individually identifying and tracking said multiple objects in a computer database responsive to said transmitted coordinate information.

19. A method for automatically and omni-directionally tracking an object within a prescribed area comprising the steps of:

engaging said object;

determining said initial position of said engaged object;

transporting said engaged object from an initial engaged position to a final disengaged position;

disengaging said object; and determining said final position of said disengaged object.

20. The invention of claim 19 wherein said steps of engaging and disengaging said object further comprise the steps of:

determining the times of said engagement and disengagement of said object; and determining at said times of engagement and disengagement the z coordinate of said object.

21. The invention of claim 20 wherein said step of transporting said engaged object further comprises the steps of:

continuously transmitting an omni-directional signal;

receiving said z coordinate of said object; and including said z coordinate with said omni-directional signal at said times of engagement and disengagement.

22. The invention of claim 21 wherein said step of transporting said engaged object further comprises the step of including said determined times of engagement and disengagement with said omni-directional signal at said times of engagement and disengagement.

23. The invention of claim 22 wherein said steps of determining said initial and final positions of said object further comprise the steps of:

continuously receiving said omni-directional signal from said transporting means;

continuously determining from said omni-directional signal the current x-y coordinates of said object;

detecting said determined times of engagement and disengagement and said z coordinate information which was included with said omni-directional signal; and determining said initial and final positions of said object based upon said current x-y and z coordinates and said detected times of engagement and disengagement.

24. The invention of claim 22 wherein said step of transporting said object further comprises the steps of:

receiving remotely transmitted x-y coordinate information pertaining to said object; and including said x-y coordinates of said object with said omni-directional signal at said times of engagement and disengagement.

25. The invention of claim 24 wherein said steps of determining said initial and final positions of said object further comprise the steps of:

continuously receiving said omni-directional signal from said transporting means;

detecting said determined times of engagement and disengagement and said x-y and z coordinate information which was included with said omni-directional signal; and determining said initial and final positions of said object based upon said current x-y and z coordinate information and said detected times of engagement and disengagement.

26. A method of automatically identifying an object within a prescribed area containing a group of one or more objects comprising the steps of;

determining the initial position of any of said objects within said group of objects; and identifying said any object based upon said initial position.

27. The invention of claim 26 wherein said step of determining said initial position further comprises the steps of:

engaging said any object;

determining the initial x-y coordinates of said any object; and determining the initial z coordinate relative to said x-y coordinates of said any object.

28. The invention claim 26 wherein said step of identifying said any object further comprises the steps of:

comparing said initial position of said any object to a set of all last known positions of said objects within said group of objects; and determining said identity of said any object from said comparison.

29. The invention of claim 27 wherein said step for determining the initial x-y coordinates of said any objects further comprises the steps of:

continuously transmitting an omni-directional signal; and continuously determining from said omni-directional signal the current x-y coordinates of said object.

30. The invention of claim 27 wherein said step for determining the initial x-y coordinates of said any objects further comprises the step of receiving remotely transmitted x-y coordinates.

31. A method for automatically and omni-directionally tracking an object during the time said object is being transported by a transporting vehicle comprising the steps of;

determining the time of engagement/disengagement of said object by said transporting vehicle; and responsive to said time of engagement/disengagement, determining the coordinates of said object during the time said object is being transported by said transporting vehicle.

32. The invention of claim 31 wherein said step of determining said coordinates of said object further comprises the steps of:

continuously transmitting an omni-directional signal; and continuously determining from said omni-directional signal the current x-y coordinates of said object.

33. The invention of claim 31 wherein said step of determining said coordinates of said object further comprises the step of receiving remotely transmitted x-y coordinates.

34. A method for automatically and omni-directionally tracking an object within a prescribed, where said object is first engaged and then disengaged by a transporting means comprising the steps of:

receiving remotely transmitted x-y coordinate information;

determining the z coordinate of said engaged or disengaged object with respect to said transporting means; and determining the absolute x-y-z coordinates of said object, responsive to said received x-y coordinate information and said z coordinate information.

35. The invention of claim 34 wherein said step of receiving remotely transmitted x-y coordinate information further comprises the step of receiving information from the Global Satellite Positioning System.

36. The invention of claim 34 wherein said method for automatically and omni-directionally racking an object within a prescribed further comprises:

transmitting said coordinate information to a remote computer system;

receiving into remote computer system multiple transmitted signals containing said coordinate information pertaining to multiple objects being simultaneously transported by multiple transporting vehicles; and individually identifying and tracking said multiple objects in a computer database responsive to said transmitted coordinate information.

* * * * *

UNITED STATES PATENT AND TRADEMARK OFFICE

CERTIFICATE OF CORRECTION

PATENT NO. : 5,604,715

DATED : February 18, 1997

INVENTOR(S) : Aman et al.

It is certified that error appears in the above-identified patent and that said Letters Patent is hereby corrected as shown below:

On the title page, and col. 1, line 1, in the title change "TRUCKING" to --TRACKING--.

In the Abstract, line 23, change "is" to --in--.

In Column 2, line 27, delete "then" and substitute --they--.

In Claim 1, Column 7, line 59, delete "tacking" and substitute --tracking--.

In Claim 1, Column 7, line 60, delete "arm" and substitute --area--.

In Claim 1, Column 7, line 60, place and indent on line 61, the following "means for engaging/disengaging said object;".

In Claim 28, Column 11, line 21, after "invention", add --of--.

UNITED STATES PATENT AND TRADEMARK OFFICE
CERTIFICATE OF CORRECTION

PATENT NO. : 5,604,715

DATED : February 18, 1997

INVENTOR(S) : Aman et al.

It is certified that error appears in the above-identified patent and that said Letters Patent is hereby corrected as shown below:

In Claim 36, Column 12, line 32, delete "racking" and substitute --tracking--.

Signed and Sealed this

Thirteenth Day of January, 1998

Attest:

BRUCE LEHMAN

*Attesting Officer* *Commissioner of Patents and Trademarks*